(12) United States Patent
Ioli

(10) Patent No.: US 8,937,559 B2
(45) Date of Patent: *Jan. 20, 2015

(54) VEHICLE IDENTIFICATION, TRACKING AND ENFORCEMENT SYSTEM

(75) Inventor: Edward D. Ioli, Los Angeles, CA (US)

(73) Assignee: Edward D. Ioli Trust, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/327,626

(22) Filed: Dec. 15, 2011

(65) Prior Publication Data

US 2012/0147190 A1     Jun. 14, 2012

Related U.S. Application Data

(63) Continuation of application No. 12/875,923, filed on Sep. 3, 2010, now Pat. No. 8,120,513, which is a continuation of application No. 12/131,443, filed on Jun. 2, 2008, now Pat. No. 7,791,501, which is a (Continued)

(51) Int. Cl.
*B60Q 1/48* (2006.01)
*G05B 19/00* (2006.01)
(Continued)

(52) U.S. Cl.
USPC ............ 340/932.2; 340/425.5; 340/5.83; 340/928; 382/104; 382/105; 235/384; 705/13

(58) Field of Classification Search
USPC ...................................... 340/932.2
See application file for complete search history.

(56) References Cited

U.S. PATENT DOCUMENTS 3,353,006 A    11/1967    Pollock
3,656,111 A     4/1972    Royster
4,368,979 A     1/1983    Ruell (Continued)

FOREIGN PATENT DOCUMENTS

DE     19904093 A1     8/2000
EP     0784838         6/2000

(Continued)

OTHER PUBLICATIONS

"Number-plate Matching for Automatic Vehicle Identification," A. S. Johnson and B. M. Bird, Electronic Images and Image Processing in Security and Forensic Science, pp. 4/1-4/8 (May 1990).

(Continued)

*Primary Examiner* — James Yang
(74) *Attorney, Agent, or Firm* — Jackson Walker L.L.P.; Christopher J. Rourk

(57) ABSTRACT

A surveillance system for monitoring a plurality of vehicle license plates comprising a portable license plate reader including a camera for automatically imaging a license plate and extracting a character string from the image for each of a plurality of moving vehicles that pass through a field of view of the camera without detection by the moving vehicles. A mobile surveillance unit positioned in proximity to the license plate reader for receiving the extracted character string from the reader, comparing each extracted character string with a list of target plate numbers, and generating an audible alarm and a visual display when a match is found. An operations center for communicating with the mobile surveillance unit to receive each extracted character string from the mobile surveillance unit and to update the list of target plate numbers stored at the mobile surveillance unit.

20 Claims, 6 Drawing Sheets

Related U.S. Application Data continuation of application No. 11/156,380, filed on Jun. 16, 2005, now Pat. No. 7,382,277, which is a continuation of application No. 10/419,414, filed on Apr. 21, 2003, now abandoned.

(60) Provisional application No. 60/319,939, filed on Feb. 12, 2003.

(51) Int. Cl.
*G06K 9/00* (2006.01)
*G07B 15/00* (2011.01)

(56) References Cited

U.S. PATENT DOCUMENTS

| | | | |
|---|---|---|---|
| 4,567,609 A | 1/1986 | Metcalf | |
| 4,603,390 A | 7/1986 | Mehdipour | |
| 4,731,854 A | 3/1988 | Gonzalez | |
| 4,764,974 A | 8/1988 | Woods | |
| 4,774,571 A | 9/1988 | Mehdipour | |
| 4,817,166 A | 3/1989 | Gonzalez | |
| 4,847,772 A | 7/1989 | Michalopoulos | |
| 4,887,080 A | 12/1989 | Gross | |
| 4,908,500 A | 3/1990 | Baumberger | |
| 4,970,389 A | 11/1990 | Danforth | |
| 5,081,685 A | 1/1992 | Jones | |
| 5,263,118 A | 11/1993 | Cornelison | |
| 5,264,854 A | 11/1993 | Spiess | |
| 5,283,573 A | 2/1994 | Takatou et al. | |
| 5,283,644 A | 2/1994 | Maeno | |
| 5,315,664 A | 5/1994 | Kumagai | |
| 5,381,155 A | 1/1995 | Gerber | |
| 5,414,624 A | 5/1995 | Anthonyson | |
| 5,425,108 A | 6/1995 | Hwang | |
| 5,436,437 A | 7/1995 | Ho | |
| 5,469,512 A | 11/1995 | Fujita | |
| 5,479,574 A | 12/1995 | Glier et al. | |
| 5,497,430 A | 3/1996 | Sadovnik et al. | |
| 5,515,042 A | 5/1996 | Nelson | |
| 5,530,441 A | 6/1996 | Takatou et al. | |
| 5,557,254 A | 9/1996 | Johnson | |
| 5,568,406 A | 10/1996 | Gerber | |
| 5,638,302 A | 6/1997 | Gerber | |
| 5,651,075 A | 7/1997 | Frazier et al. | |
| 5,737,710 A | 4/1998 | Anthonyson | |
| 5,774,569 A | 6/1998 | Waldenmaier | |
| 5,777,951 A | 7/1998 | Mitschele | |
| 5,805,082 A | 9/1998 | Hassett | |
| 5,809,161 A | 9/1998 | Auty | |
| 5,831,669 A | 11/1998 | Adrain | |
| 5,845,268 A | 12/1998 | Moore | |
| 5,850,191 A | 12/1998 | Yagi | |
| 5,864,306 A | 1/1999 | Dwyer | |
| 5,877,969 A | 3/1999 | Gerber | |
| 5,896,167 A | 4/1999 | Omae | |
| 5,912,822 A | 6/1999 | Davis | |
| 5,935,190 A | 8/1999 | Davis | |
| 5,938,717 A | 8/1999 | Dunne | |
| 5,948,038 A | 9/1999 | Daly | |
| 5,963,129 A | 10/1999 | Warner | |
| 6,052,065 A | 4/2000 | Glover | |
| 6,081,206 A | 6/2000 | Kielland | |
| 6,111,523 A | 8/2000 | Mie | |
| 6,121,898 A | 9/2000 | Moetteli | |
| 6,161,066 A | 12/2000 | Wright | |
| 6,188,329 B1 | 2/2001 | Glier | |
| 6,240,217 B1 | 5/2001 | Ercan | |
| 6,243,029 B1 | 6/2001 | Tomer | |
| 6,266,627 B1 | 7/2001 | Gatsonides | |
| 6,281,808 B1 | 8/2001 | Glier | |
| 6,340,935 B1 | 1/2002 | Hall | |
| 6,344,806 B1 | 2/2002 | Katz | |
| 6,373,402 B1 | 4/2002 | Mee | |
| 6,373,962 B1 | 4/2002 | Kanade | |
| 6,374,240 B1 | 4/2002 | Walker | |
| 6,377,191 B1 | 4/2002 | Takubo | |
| 6,394,356 B1 | 5/2002 | Zagami | |
| 6,404,902 B1 * | 6/2002 | Takano et al. | 382/104 |
| 6,420,977 B1 | 7/2002 | Corbitt et al. | |
| 6,426,707 B1 | 7/2002 | Prieto et al. | |
| 6,433,706 B1 | 8/2002 | Anderson | |
| 6,437,690 B1 | 8/2002 | Okezie | |
| 6,442,474 B1 | 8/2002 | Trajkovic et al. | |
| 6,459,386 B1 | 10/2002 | Jones | |
| 6,466,260 B1 | 10/2002 | Hatae | |
| 6,473,517 B1 * | 10/2002 | Tyan et al. | 382/105 |
| 6,501,391 B1 | 12/2002 | Racunas, Jr. | |
| 6,525,673 B1 | 2/2003 | Feldman | |
| 6,546,119 B2 | 4/2003 | Ciolli et al. | |
| 6,560,360 B1 | 5/2003 | Neskovic et al. | |
| 6,563,948 B2 | 5/2003 | Tan et al. | |
| 6,573,929 B1 | 6/2003 | Glier et al. | |
| 6,647,361 B1 | 11/2003 | Laird et al. | |
| 6,690,294 B1 | 2/2004 | Zierden | |
| 6,750,786 B1 | 6/2004 | Racunas, Jr. | |
| 6,754,663 B1 | 6/2004 | Small et al. | |
| 6,757,008 B1 | 6/2004 | Smith | |
| 6,760,061 B1 | 7/2004 | Glier et al. | |
| 6,816,085 B1 | 11/2004 | Haynes | |
| 6,832,728 B2 | 12/2004 | Kennedy | |
| 6,919,823 B1 | 7/2005 | Lock | |
| 6,920,391 B2 | 7/2005 | Daubert et al. | |
| 6,934,844 B2 | 8/2005 | Phillips et al. | |
| 6,946,974 B1 | 9/2005 | Racunas, Jr. | |
| 6,950,789 B2 | 9/2005 | Laird et al. | |
| 6,970,102 B2 | 11/2005 | Ciolli | |
| 7,002,487 B1 | 2/2006 | Montgomery, Sr. | |
| 7,031,553 B2 | 4/2006 | Myers et al. | |
| 7,104,447 B1 | 9/2006 | Lopez et al. | |
| 7,171,378 B2 | 1/2007 | Petrovich et al. | |
| 7,196,950 B2 | 3/2007 | Kanda et al. | |
| 7,199,674 B2 | 4/2007 | Ash | |
| 7,239,760 B2 | 7/2007 | Di Bernardo et al. | |
| 7,246,008 B2 | 7/2007 | Daubert et al. | |
| 7,254,482 B2 | 8/2007 | Kawasaki et al. | |
| 7,310,112 B1 | 12/2007 | Watanabe | |
| 7,382,277 B2 * | 6/2008 | Ioli Trust | 340/932.2 |
| 7,406,028 B2 | 7/2008 | Kratochwil et al. | |
| 7,412,078 B2 | 8/2008 | Kim | |
| 7,460,028 B2 | 12/2008 | Garibotto et al. | |
| 7,504,965 B1 * | 3/2009 | Windover et al. | 340/937 |
| 7,791,501 B2 * | 9/2010 | Ioli | 340/932.2 |
| 8,120,513 B2 * | 2/2012 | Ioli | 340/932.2 |
| 2002/0080013 A1 | 6/2002 | Anderson | |
| 2002/0097145 A1 | 7/2002 | Tumey et al. | |
| 2002/0135703 A1 | 9/2002 | Schmitz | |
| 2002/0140577 A1 | 10/2002 | Kavner | |
| 2002/0140579 A1 | 10/2002 | Kavner | |
| 2002/0141618 A1 | 10/2002 | Ciolli | |
| 2004/0001142 A1 | 1/2004 | Kumhyr | |
| 2004/0104813 A1 * | 6/2004 | Rau et al. | 340/425.5 |

FOREIGN PATENT DOCUMENTS

| | | |
|---|---|---|
| GB | 2302608 | 1/1997 |
| JP | 11272900 | 10/1999 |
| WO | 02/080091 | 10/2002 |
| WO | 01/69571 | 2/2006 |

OTHER PUBLICATIONS

"Automatic Vehicle Identification—AVI—Electronic License Plates: The Public Safety Perspective," David Avivi, IEEE 25th Annual 1991 International Carnahan Conference on Security Technology, pp. 96-99 (Oct. 1991).

"Image Processing System for Traffic Measurement," N. Nishiyama, K. Kato and T. Hinenoya, 1991 International Conference on Industrial Electronics, Control and Instrumentation, pp. 1725-1729 (Oct.-Nov. 1991).

"Image Capture and Automatic Identification of Vehicle Registration Plates," D. J. Robertson and A. Dowson, IEE Colloquium on Electronic Techniques for Road Pricing and Tolling, pp. 5/1-5/4 (Mar. 1995).

(56) References Cited

OTHER PUBLICATIONS

"Automatic Car Plate Detection and Recognition Through Intelligent Vision Engineering," Luis Salgado, José M. Menéndez, Enrique Rendón and Narciso Garcia, IEEE 33rd Annual 1999 International Carnahan Conference on Security Technology, pp. 71-76 (1999).

"Automated Detection of All Kinds of Violations at a Street Intersection Using Real Time Individual Vehicle Tracking," Dae-Woon Lim, Sung-Hoon Choi, Joon-Suk Jun, Fifth IEEE Southwest Symposium on Image Analysis and Interpretation, pp. 126-129 (2002).

"License Plate Recognition System: Formal Proposal," Jamey Brown et. al, ECE 4006D Internetwork Design, Georgia Institute of Technology (Sep. 19, 2002).

"SeeCar DLL: General & Technical Information," Hi-Tech Solutions (Jan. 5, 2003).

Halina Kwasnicka; Bartosz Wawrzyniak, "License Plate Localization and Recognition in Camera Pictures," Nov. 13-15, 2002.

Manuel D. Rossetti, Ph.D.; Jeff Baker, Applications and Evaluations of Automated License Plate Reading Systems 2001.

David J. Robertson, "Automatic Number Plate Reading for Transport Application," 1993.

M2 Communications Ltd. "Neural Network Designed for Road Speed Detection," 1994.

Dr. David W. Tindall; Mr. Richard L. Hodgson, "Evaluation and Trials of an Automatic License Plate Recognition System Employing Neural Network Techniques," Apr. 1994.

Chris Partridge, "Your Number May Be Up," May 1994.

Nigel Beats, "Neural Network License Plate Recognition," Apr. 1994.

Robert Matthews, "Computer Spy Keeps Eye Out for Terror Cars," Sep. 1993.

D.W. Tindall, "Application of Neural Network Techniques to Automatic License Plate Recognition," May 1995.

Yaser S. Abu-Mostafa, Demetri Psaltis, "Optical Neural Computers," Mar. 1987.

Talon Systems sales advertising brochure, May 1993.

"Magic eye may spot toll cheats," Ian Morton, May 17, 1994.

"Racal Radio Launch a New Vehicle Number Plate Camera System," May 11, 1994, Computergram.

Auto Find User's Manual, Apr. 2001.

Gatekeeper Specification and Product Offering, Nov. 2001.

"License plate localization and recognition in camera pictures," Halina Kwaśnicka and Bartosz Wawrzyniak, Nov. 13, 2002.

"Name, Rank and Number The Role of Automatic Number Plate Recognition and Orbis Security" Jan. 1, 1999.

Preliminary Invalidity Contentions of Defendants Image Sensing Systems, Inc. and Citysync Technologies, Inc., Civ. No. 2:10-cv-00605-DF, United states District Court for the Eastern District of Texas, Feb. 2, 2012.

Preliminary Invalidity Contentions of Defendant Coban Technologies, Inc., Civ. No. 2:10-cv-00605-DF, United States District Court for the Eastern District of Texas, Feb. 2, 2012.

Preliminary Invalidity Contentions of Defendant North Elsag America, LLC, Civ. No. 2:10-cv-00605-DF, United states District Court for the Eastern District of Texas, Feb. 2, 2012.

Defendant Mvconnect's Preliminary Invalidity Contentions, Civ. No. 2:10-cv-00605-DF, United states District Court for the Eastern District of Texas, Feb. 2, 2012.

Preliminary Invalidity Contentions of Defendants Perceptics et al. Civ. No. 2:10-cv-00605-DF, United states District Court for the Eastern District of Texas, Feb. 2, 2012.

Defendant PIPS Technology, Inc.'s Invalidity Contentions, Civ. No. 2:10-cv-00605-DF, United states District Court for the Eastern District of Texas, Feb. 2, 2012.

Defendant Vigilant Video Invalidity Contentions, Civ. No. 2:10-cv-00605-DF, United states District Court for the Eastern District of Texas, Feb. 2, 2012.

Antoine Hobeika and Nattaporn Yaungyai, "Evaluation Update of the Red Light Camera Program in Fairfax County, VA," IEEE Transactions on Intelligent Transportation Systems, vol. 7, No. 4, Dec. 2006, pp. 588-596.

Nelson H.C. Yung and Andrew H.S. Lai, "An Effective Video Analysis Method for Detecting Red Light Runners," IEEE Transactions on Vehicular Technology, vol. 50, No. 4, Jul. 2001, pp. 1074-1084.

D. Turner and P. Monger, "The Bus Lane Enforcement Cameras Project," The Institution of Electrical Engineers, 1996, Printed and Published by the IEE, Savoy Place, London WC2R 0bl, UK, 3 pgs.

S.R. Lewis, "Future System Specifications for Traffic Enforcement Equipment," Crown Copyright 1996, 2 pgs.

J.D. Steel, "Nottinghamshire's Red Camera Experiment," Nottinghamshire County Council—Planning and Transportation, Third International Conference on Road Traffic Control, May 1-3, 1990, pp. 168-172.

S.D. Lawson, H.T. Morris, R.W. Hardy and A.C. Howard, "Red-Light Running and Surveillance Cameras—Policy Issues Related to Accident Reduction and Enforcement," The Automobile Association, UK, Sixth International Conference on Road Traffic Monitoring and Control, Apr. 28-30, 1992, pp. 38-42.

Dae-Woon Lim, Sung-Hoon Choi, Joon-Suk Jun, "Automated Detection of all Kinds of Violations at a Street Intersection Using Real Time Individual Vehicle Tracking," Fifth IEEE Southwest Symposium on Image Analysis and Interpretation, 2002, pp. 126-129.

Andrew J. Blumberg, Lauren S. Keeler, Abhi Shelat, "Automated Traffic Enforcement Which Respects 'Driver Privacy'" Proceedings of the 8th International IEEE Conference on Intelligent Transportation Systems, Vienna, Austria, Sep. 13-16, 2005, pp. 941-946.

U.S. Patent and Trademark Office; Office Action; Reexamination Serial No. 90/012,419; Nov. 2, 2012.

U.S. Patent and Trademark Office; Office Action; Reexamination Serial No. 90/012,425; Nov. 9, 2012.

United States District Court for the Eastern District of Texas Marshall Division; Defendant City of Lewisville, Texas' Original Answer and Affirmative Defenses, filed strictly subject to Defendant's Contemporaneously filed Rule 12(b)(1) and Rule 12(b)(6) Motions to Dismiss; Case 2:10-cv-00605-DF, Mar. 30, 2011, 19 pages.

United States District Court for the Eastern District of Texas Marshall Division; Defendant City of Richardson, Texas' Original Answer and Affirmative Defenses, filed strictly subject to Defendant's Contemporaneously filed Rule 12(b)(1) and Rule 12(b)(6) Motions to Dismiss; Case 2:10-cv-00605-DF, Mar. 30, 2011, 19 pages.

United States District Court for the Eastern District of Texas Marshall Division; Defendant Collin County, Texas' Original Answer and Affirmative Defenses, filed strictly subject to Defendant's Contemporaneously filed Rule 12(b)(1) and Rule 12(b)(6) Motions to Dismiss; Case 2:10-cv-00605-DF, Mar. 30, 2011, 19 pages.

United States District Court for the Eastern District of Texas Marshall Division; Defendant Traffipax Inc.'s Original Answer, Defenses, and Counterclaims to Plaintiffs First Amended Complaint for Patent Infringement; Case 2:10-cv-00605-DF, Mar. 28, 2011, 17 pages.

United States District Court for the Eastern District of Texas Marshall Division; Answer and Counterclaims of Defendant PIPS Technology Inc.; Case 2:10-cv-00605-DF, Mar. 28, 2011, 19 pages.

United States District Court for the Eastern District of Texas Marshall Division; Defendant Digital Recognition Network, Inc.'s Original Answer and Counterclaim; Case 2:10-cv-00605-DF, Mar. 23, 2011, 14 pages.

United States District Court for the Eastern District of Texas Marshall Division; Bearcom Group, Inc.'s Original Answer; Case 2:10-cv-00605-DF, Mar. 23, 2011, 16 pages.

United States District Court for the Eastern District of Texas Marshall Division; Defendant Citysync Technologies, Inc.'s Answer to Plaintiffs' First Amended Complaint; Case 2:10-cv-00605-DF, Mar. 23, 2011, 14 pages United States District Court for the Eastern District of Texas Marshall Division; Answer of Defendant Coban Technologies, Inc. to Plaintiffs First Amended Complaint for Patent Infringement; Case 2:10-cv-00605-DF, Mar. 23, 2011,14 pages.

United States District Court for the Eastern District of Texas Marshall Division; Defendant Image Sensing Systems, Inc.'s Answer to Plaintiffs' First Amended Complaint; Case 2:10-cv-00605-DF, Mar. 23, 2011,14 pages.

United States District Court for the Eastern District of Texas Marshall Division; Answer, Affirmative Defenses and Counterclaims of Perceptics, LLC.; Case 2:10-cv-00605-DF, Mar. 23, 2011, 20 pages.

(56) References Cited

OTHER PUBLICATIONS

United States District Court for the Eastern District of Texas Marshall Division; Answer, Affirmative Defenses and Counterclaims of Platescan, Inc.; Case 2:10-cv-00605-DF, Mar. 23, 2011, 20 pages.

United States District Court for the Eastern District of Texas Marshall Division; Defendant Elsag North America LLC's Answer and Affirmative Defenses to Plaintiffs' First Amended Complaint; Case 2:10-cv-00605-DF, Mar. 23, 2011, 17 pages.

United States District Court for the Eastern District of Texas Marshall Division; Provisional Opinion and Order; Case 2:10-cv-00605-JRG, Aug. 7, 2012, 7 pages.

Pearpoint Image Processing Systems (PIPS) Automated License Plate Recognition Systems Infringement Contentions U.S. Patent No. 7,382,277, Nov. 4, 2011.

Pearpoint Image Processing Systems (PIPS) Automated License Plate Recognition Systems Infringement Contentions U.S. Patent No. 7,791,501, Nov. 4, 2011.

* cited by examiner

VEHICLE IDENTIFICATION, TRACKING AND ENFORCEMENT SYSTEM

RELATED APPLICATIONS

This application is a continuation of U.S. application Ser. No. 12/875,923, filed Sep. 3, 2010, now U.S. Pat. No. 8,120,513, and is a continuation of U.S. application Ser. No. 12/131,443, filed Jun. 2, 2008, now U.S. Pat. No. 7,791,501, and is a continuation of U.S. application Ser. No. 11/156,380, filed Jun. 16, 2005, now U.S. Pat. No. 7,382,277, and is a continuation of U.S. application Ser. No. 10/419,414, filed Apr. 21, 2003, now abandoned, each of which are incorporated by reference for all purposes.

FIELD OF THE INVENTION

The present invention pertains to vehicle tracking and parking enforcement, and more specifically to a system for vehicle tracking and parking enforcement that generates vehicle identification data and tracks vehicles using the vehicle identification data.

BACKGROUND OF THE INVENTION

Parking meter systems are known in the art. Such parking meter systems generally use cellular telephones or other devices to allow a user to pay for parking, and may also alert the user when additional funds are required to pay for an additional parking interval. Nevertheless, if the meter expires and the vehicle is still parked, parking enforcement personnel must be present to place a ticket on the vehicle for a parking violation. Likewise, if the vehicle leaves the parking space and a new vehicle parks in the meter while time is still present on the meter, then the new vehicle occupant gets a "free ride" on the parking toll paid by the previous user. Thus, prior art systems require significant enforcement resources and also result in lost potential revenue.

SUMMARY OF THE INVENTION

In accordance with the present invention, a system for vehicle identification, tracking and parking enforcement is provided that can be used to decrease parking enforcement costs and increase revenue generation.

In particular, a system for vehicle identification, tracking and parking enforcement is provided that allows vehicles to be tracked so as to allow parking enforcement personnel or jurisdictional vehicle parking violation ticket issuing systems to be notified when a vehicle is present that should be ticketed.

In accordance with an exemplary embodiment of the present invention, a system for monitoring parking is provided, such as to monitor vehicles in parking spaces without the need for parking enforcement personnel. The system includes a meter system that generates image data of a vehicle in a parking space, such as by creating an array of pixel data in a predetermined field of view that includes a vehicle identification tag. An enforcement and tracking system receives the image data, and extracts a digitized form of the vehicle license number from the image data, such as by analyzing the image data to identify the vehicle license number based on the expected location of the license tag, image data characteristics of the license tag, or other suitable data.

The present invention provides many important technical advantages. One important technical advantage of the present invention is a system for vehicle identification, monitoring, and parking enforcement that allows vehicles to be identified and tracked without operator involvement.

Those skilled in the art will further appreciate the advantages and superior features of the invention together with other important aspects thereof on reading the detailed description that follows in conjunction with the drawings.

DETAILED DESCRIPTION OF THE INVENTION

Figure 1:
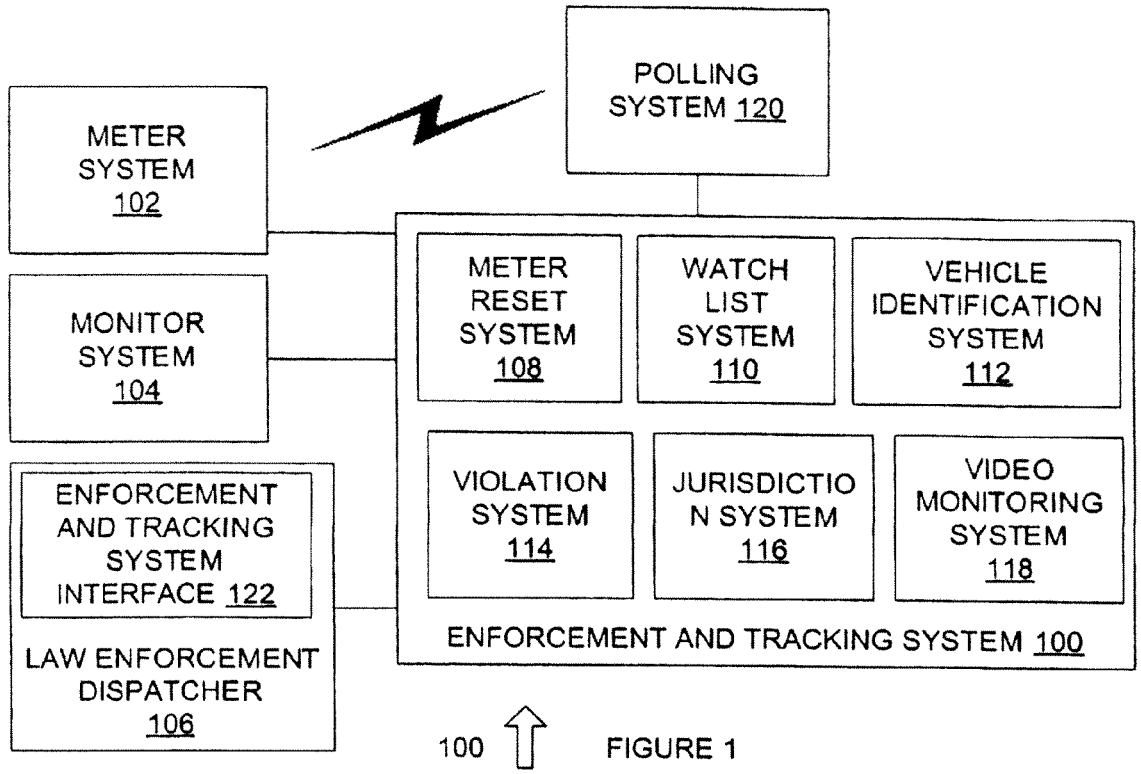
FIG. 1 is a diagram of a system for vehicle identification, tracking and parking enforcement in accordance with an exemplary embodiment of the present invention.

In the description that follows like parts are marked throughout the specification and drawings with the same reference numerals, respectively. The drawing figures are not necessarily to scale and certain features may be shown in somewhat generalized or schematic form in the interest of clarity and conciseness.

FIG. 1 is a diagram of a system 100 for vehicle identification, tracking and parking enforcement in accordance with an exemplary embodiment of the present invention. System 100 allows vehicles to be identified and tracked for parking administration and law enforcement without significant personnel intervention.

System 100 includes meter system 102, monitor system 104, law enforcement dispatcher 106, meter reset system 108, watch list system 110, vehicle identification system 112, violation system 114, jurisdiction system 116, and video monitoring system 118, each of which can be implemented in hardware, software, or a suitable combination of hardware and software. In one exemplary embodiment, meter system 102 can include a coin-operated parking meter with image capture, data storage, data processing, and communications functionality. Likewise, monitor system 104 can be coordinated for use with existing meter systems 102 and can provide image capture, data storage, data processing, and communications functionality. Monitor system 104 can provide the functions of a parking meter but can be adapted not to receive coins or other payment, such as where monitor system 104 is used with parking metering systems that are based solely on vehicle identification tags or other vehicle identification.

Enforcement and tracking system 100 and its associated systems can be implemented in software on a general purpose server platform, such as in a central location to coordinate the activities of a plurality of meter systems 102 and monitor systems 104. Each meter system 102 and monitor system 104 can be coupled to enforcement and tracking system 100 via the public switched telephone network (PSTN), a wireless network, a fiber optic network, suitable wireless or wireline signaling, infrared signaling, intermediary devices such as hand-held polling systems or cellular devices with wireless communications to an enforcement and tracking system 100 server, or other suitable systems or processes. For example, polling system 120 can be a hand-held device carried by parking enforcement personnel that is used to poll meter system 102 or monitor system 104, and which collects data from either meter system 102 or monitor system 104, and which provides the data to system 100 and its associated systems.

Law enforcement dispatcher 106 can be an existing law enforcement dispatcher system that receives alert data and provides notification data to a dispatch operator for use in notifying law enforcement personnel. In one exemplary embodiment, law enforcement dispatcher 106 can include an enforcement and tracking system interface 122. In another exemplary embodiment, system 100 can provide data to law enforcement dispatcher 106 in a data format that is compatible with that already used by law enforcement dispatcher 106.

Meter system 102 can capture the image data of a vehicle after the vehicle has parked in a parking area. In one exemplary embodiment, weight sensors, metal sensors, image data, heat sensors, motion sensors, or other suitable sensors can be used to activate meter system 102 to generate image data. In another exemplary embodiment, meter system 102 can continuously generate and analyze image data, and can initiate tracking of a vehicle that is parked in a parking area, such as by determining that a vehicle has remained stationary in the parking area for a pre-determined period of time based on image analysis. Meter system 102 can also receive coins, banknotes, credit cards, or other suitable payment, such that a period of time associated with the amount of payment received can be displayed by the meter.

Monitor system 104 can provide monitor functions similar to those provided by meter system 102, with the exception that receipt of coinage or other payment types does not need to be provided by monitor system 104. In this exemplary embodiment, monitor system 104 can be used to minimize the risk of vandalism or other damaging attacks that may be committed to retrieve the coinage or other payment stored in monitor system 104. Non coinage collecting "posts" can also used to identify and track vehicles entering or leaving highways and non-coinage collection parking spaces.

Meter reset system 108 receives meter data from meter system 102 and generates meter reset data. In one exemplary embodiment, the meter data received from meter system 102 can include automobile arrival data, automobile departure data, meter time data, or other suitable data. Meter reset system 108 can reset meter system 102 after a vehicle has left a parking area, such as where an amount of time remains on meter system 102. In this exemplary embodiment, a user can pay for parking in a parking area for a period of time at a meter system 102, but may utilize the parking area for less than the full period of time. Meter reset system 108 resets meter system 102 so that a subsequent user cannot park in the parking area controlled by meter system 102 and thus act as a "free rider" on the previously paid meter toll. Likewise, meter reset system 108 can be implemented as part of meter system 102, such as where meter system 102 includes data processing and other suitable functions.

Watch list system 110 receives watch list data and determines whether a vehicle parked in a parking area that is monitored by meter system 102 or monitor system 104 is on the watch list. In one exemplary embodiment, watch list system 110 can interface with law enforcement databases, "Amber Alert" databases, homeland security databases, or other suitable databases, and can be periodically updated to provide a list of vehicle identification data for which the vehicle, driver, occupants, or other persons associated with the vehicle are being sought.

Vehicle identification system 112 receives image data from meter system 102 and identifies license tag data, handicap identification tag data, reserved (permit) parking area tag data and other suitable tag data from the image data. In one exemplary embodiment, vehicle identification system 112 can be implemented in conjunction with meter system 102, such as where meter system 102 includes suitable data processing and storage functions to perform tag identification functions. Vehicle identification system 112 can also identify vehicles based on pre-determined allowable outlines or shapes of vehicles, and can look for tag data in pre-determined locations where tag data is expected, to prevent spurious identification of bumper stickers or other data as tag data. Likewise, vehicle identification system 112 can use distinctive features of license tags, handicap tags, or other suitable tags as keys to locate the vehicle identification number, can receive radio frequency ID tag data, barcode data, or other suitable tag identification data. Notification data can also be generated and transmitted or otherwise provided to the authorities if vehicle identification system 112 is unable to identify license plate or identification tag data from the vehicle.

Violation system 114 determines whether a parking violation or other violation has occurred. In one exemplary embodiment, violation system 114 receives data from meter system 102 and determines whether the amount of time that has been paid for has been exceeded. In another exemplary embodiment, violation system 114 can alert a user of an impending violation, such as where the user has registered a phone number or other suitable address at which the user can be contacted. Likewise, violation system 114 can receive data from vehicle identification system 112, such as to determine whether a non-handicapped person is parking in a parking area that has been reserved for handicapped persons, whether an unauthorized person is parking in a parking area that has been reserved for predetermined vehicles, or whether other violations have occurred. Likewise, violation system 114 can be used to determine when a violation has occurred by somebody parking in a parking area during a time period when parking is not allowed, such as during rush hours, overnight, or at other inappropriate times.

Jurisdiction system 116 receives location data from meter system 102 or monitor system 104 and jurisdiction data from watch list system 110, and provides notification data to a suitable jurisdiction when a match with a watch list system 110 is identified. In one exemplary embodiment, watch list system 110 can include severity level indicators regarding the severity level of the violation for which the vehicle is on the watch list. For example, if a violent felon has been sighted driving a vehicle and the vehicle identification number has been placed on the watch list, watch list system 110 can indicate that the driver of the vehicle should be approached with caution and the level of force that should be used if necessary. Jurisdiction system 116 can receive this watch list data and can generate suitable notification data to appropriate jurisdictions, such as state authorities, federal authorities, city authorities, county authorities, homeland security authorities, Amber Alert authorities, or other suitable authorities.

Video monitoring system 118 allows video monitoring to be performed by meter system 102 and monitor system 104. In one exemplary embodiment, meter system 102 and monitor system 104 can generate video data or a sequence of images that approximate video data and can transmit the image data for storage by video monitoring system 118 in a centralized location. Likewise, video monitoring system 118 can be implemented at meter system 102 or monitor system 104, such as by using a pre-determined amount of memory for storing a loop of video data in a pre-determined area, or other suitable functions. Video monitoring system 118 can provide additional video data processing, such as to extract license tag data, facial image data, or other suitable data, to compare facial image data with a facial image database to determine whether the facial image data matches stored facial image data, and can perform other suitable functions.

In operation, system 100 allows parking areas to be monitored to aid in parking revenue collection and enforcement, and also in law enforcement activities. System 100 aids in parking revenue and enforcement by ensuring that all parking violations are detected and fined, and by allowing meters to be reset so as to avoid free riders or other losses of revenue sources. System 100 also allows law enforcement activities to be supported by helping to identify vehicles that are under suspicion or that may have occupants that are sought by law enforcement agencies, and by notifying appropriate authorities in a real-time environment. In this manner, system 100 not only generates additional revenue but also provides for improved law enforcement activities.

Figure 2:
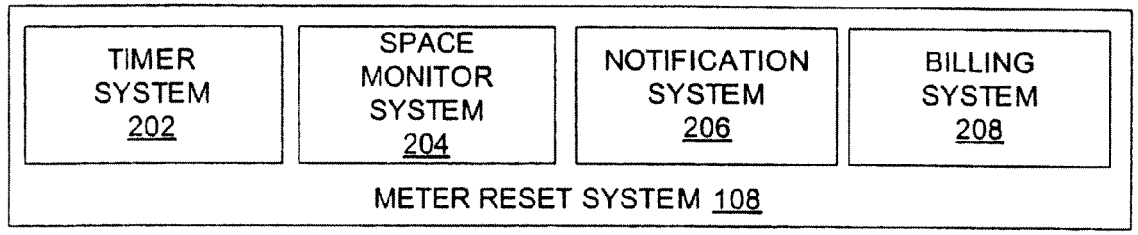
FIG. 2 is a diagram of a system for resetting a parking meter in accordance with an exemplary embodiment of the present invention.

FIG. 2 is a diagram of a system 200 for resetting a parking meter in accordance with an exemplary embodiment of the present invention. System 200 includes meter reset system 108 and timer system 202, space monitor system 204, notification system 206, and billing system 208, each of which can be implemented in hardware, software, or a suitable combination of hardware and software, and which can be one or more software systems operating on a general purpose processing platform.

Timer system 202 generates timer data for a parking meter based on an amount of money that has been provided, such as by depositing the money at the meter. In one exemplary embodiment, timer system 202 can be activated upon collection of coinage, banknotes, entry of an amount from a keypad after entry of a credit card, or other suitable processes including electronic payment through wireless communication. Likewise, timer system 202 can track the amount of time that a vehicle is parked in an area, such as where the vehicle uses a radio frequency ID tag, driver's license tag ID data, or other suitable processes for assessing parking charges to the vehicle. Timer system 202 can also generate timer expiration data, such as where timer system 202 is used to track the amount of time based on payment made at the meter, and can generate total time data such as for systems where the total amount of time that a vehicle is parked in an area is used to assess parking charges.

Space monitor system 204 monitors one or more parking spaces and generates space occupation data. In one exemplary embodiment, space monitor system 204 can use sound waves, metal sensors, weight sensors, lasers, image data, or other suitable processes to determine whether a parking space has a vehicle parked in it. For example, if image data is used, image data of a parking space can be generated and the image data can be analyzed to determine whether a vehicle is present in the space. Space monitor system 204 can generate timer initiation data, timer termination data, tag identification system initiation data, or other suitable data.

In one exemplary embodiment, notification system 206 generates notification data when an amount of time on a parking meter has expired or is about to expire. In this exemplary embodiment, notification system 206 can notify parking enforcement personnel or other suitable systems that a meter has expired and that a violation has occurred. In another exemplary embodiment, notification system 206 can notify a user who has registered with the system of the impending expiration of their meter, thus to allow the user to return to the meter and provide additional coins or currency, to authorize payment of an additional time increment using a cell phone, a credit card or other suitable processes. The notification time period can also be programmable, such as to allow the user to adjust the time he or she needs to refill the meter based on the method he or she will use to pay (e.g., if the user is far way from the parking spot and plans on paying cash for the parking spot, he or she would need a reasonable notification time to reach the meter in question). Notification system 206 can allow the user to adjust the notification time based on the user's need at that specific time.

Billing system 208 receives parking time data and performs billing processes. In one exemplary embodiment, billing system 208 can receive vehicle identification data and time data for the vehicle if a vehicle remained in a parking area and can assess charges against a credit card, bank account, credit balance, or other suitable systems to charge the vehicle for parking charges. Likewise, billing system 208 can handle currency payment and coinage, banknotes, or other suitable processes.

In operation, system 200 allows a meter system 102, monitor system 104, or other suitable systems to be operated and reset, so as to prevent the opportunity for parkers to get a free ride based on parking fees paid by others, so as to allow parkers to be notified of impending parking violations and to allow them to pay additional funds or take alternate steps, or to perform other suitable processes.

Figure 3:
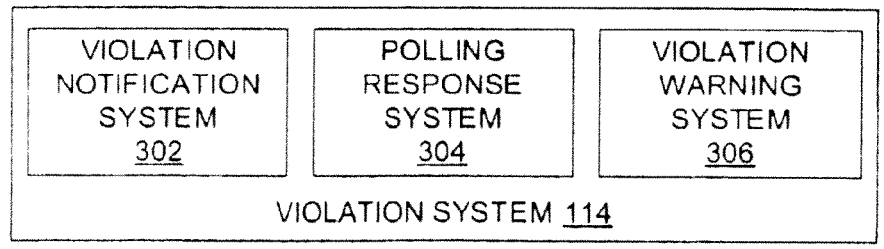
FIG. 3 is a diagram of a system for monitoring violations in accordance with an exemplary embodiment of the present invention.

FIG. 3 is a diagram of a system 300 for monitoring violations in accordance with an exemplary embodiment of the present invention. System 300 includes violation system 114 and violation notification system 302, polling response system 304, and violation warning system 306, each of which can be implemented in hardware, software, or a suitable combination of hardware and software, and which can be one or more software systems operating on a general purpose processing platform.

Violation notification system 302 generates violation notification data upon receipt of violation data from a timer system 202, space monitor system 204, or other suitable systems. In one exemplary embodiment, violation notification system 302 can generate a parking violation for transmittal to the registered owner of a vehicle, such as a ticket that requires payment or other suitable notifications. In another exemplary embodiment, violation notification system 302 can generate and transmit notification data to parking enforcement personnel, so as to allow the parking enforcement personnel to travel to the vehicle, verify that it is in violation, and write a ticket, or perform other suitable procedures.

Polling response system 304 provides polling response data to parking enforcement personnel or other suitable systems. In one exemplary embodiment, parking enforcement personnel can carry a polling unit that emits infrared radiation, radio frequency electromagnetic radiation, or other suitable signals and which queries the parking meters for parking violation data. Polling response system 304 can then generate response data that notifies the parking enforcement personnel that the current vehicle in the parking area has incurred a violation, that a vehicle that is no longer in the area has incurred a violation, or other suitable polling response data. Likewise, polling response system 304 can interface with watch list system 110 or other suitable systems and can notify law enforcement or parking enforcement personnel that the operator or owner of the vehicle may be wanted for other violations, that additional armed assistance may be required for apprehension of the owner, or other suitable responses.

Violation warning system 306 generates violation warning data to a user. In one exemplary embodiment, violation warning system 306 can contact a user at a registered cell phone number or other suitable numbers and can notify the user of an impending violation. Likewise, violation warning system 306 can notify a user that a violation has occurred and can give the user a pre-determined period of time to correct the situation by providing additional currency, an opportunity to phone in and providing additional payment information, or time to perform other suitable processes so as to avoid a violation. Likewise, if it is determined that a user has not previously violated a parking regulation for a pre-determined period of time, violation warning system 306 can generate warning data to notify the user that they would have received a violation and that they will receive one the next time a violation occurs. Likewise, other suitable processes can be used.

In operation, system 300 allows violations for parking infractions to be generated and monitored so as to insure that any person incurring a parking violation is issued a violation or a warning. System 300 also allows parking enforcement personnel to readily determine the status of a meter so as to wirelessly obtain data from the meter regarding current and previous parkers or users so as to allow the parking enforcement personnel to verify that a violation has occurred and issue citations where needed. System 300 can be used in a "batch" mode, such as where data is collected and processed periodically, in a "real-time" mode, where data is continuously collected and processed, in a suitable combination of batch and real-time processing, or in other suitable manners.

Figure 4:
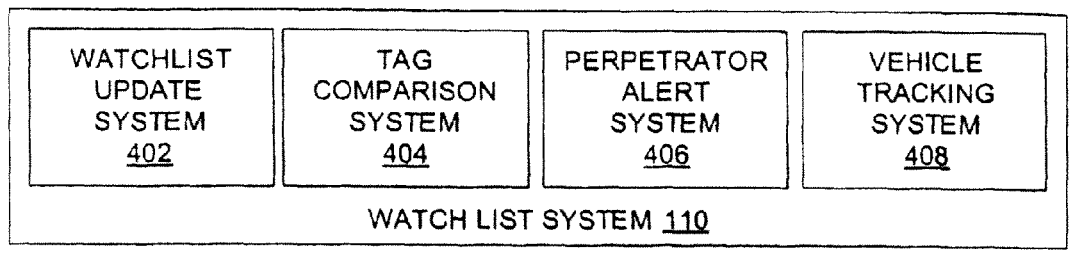
FIG. 4 is a diagram of a system for providing watch list functions in accordance with an exemplary embodiment of the present invention.

FIG. 4 is a diagram of a system 400 for providing watch list functions in accordance with an exemplary embodiment of the present invention. System 400 includes watch list system 110 and watch list update system 402, tag comparison system 404, perpetrator alert system 406, and vehicle tracking system 408, each of which may be implemented in hardware, software, or a suitable combination of hardware and software which may be one or more software systems operating on a general purpose processing platform.

Watch list update system 402 provides watch list update functionality for updating a watch list of vehicle tag numbers or other suitable identification data for tracking vehicles for which violation of parking regulations or other losses occur. In one exemplary embodiment, watch list update system 402 periodically interfaces with watch list systems on law enforcement agencies or other suitable sources to obtain updated vehicle identification data. For example, a vehicle owner having past due parking violations or other infractions may make payments on such infractions, and it may be necessary to update the watch list on an hourly or daily basis so as to minimize the amount of time spent detaining persons who have already satisfied their obligations. Likewise, systems such as the Amber Alert system, homeland security systems, or other suitable systems may require frequent updating. In one exemplary embodiment, watch list update system 402 can both poll and be polled, such that an active update can be performed where needed by some systems and where watch list update system 402 can obtain updates on a periodic basis from other systems.

Tag comparison system 404 receives vehicle identification tag data or other suitable identification data such as radio frequency ID tag data or barcode data and compares that data to watch list data. In one exemplary embodiment, tag comparison system 404 can request additional confirmation of tag ID when conflicting data is obtained, such as when first tag comparison indicates that a vehicle is present in a first location and a second tag comparison indicates that the same vehicle is present in a second location that would not have been accessible to the same vehicle within the time period between observations.

Perpetrator alert system 406 generates perpetrator alerts based on the results of tag comparison system 404. In one exemplary embodiment, tag comparison system 404 may indicate that a parking violation perpetrator is present, and perpetrator alert system 406 can generate a suitable alert, such as to alert the parking municipality personnel of the location of the perpetrator. Likewise, if a law enforcement database indicates that a violent criminal or other suitable perpetrator of greater significance is present, perpetrator alert system 406 can notify the suitable personnel who can apprehend and deal appropriately with such violent criminals or terrorists, or other persons.

Vehicle tracking system 408 allows vehicle identification data and vehicle location data to be tracked, such as to allow the path of a vehicle to be determined, an estimated destination to be determined, or other suitable data to be determined. Vehicle tracking system 408 can store vehicle identification data, physical location data, time data associated with the location at which the vehicle was tracked, and other suitable data. Vehicle tracking system 408 can further provide estimated location data, such as by determining a rate of travel, time since a last tracking event, and possible roads that the tracked vehicle could have taken.

In operation, system 400 allows vehicle identification data to be monitored and compared against lists of vehicles that are wanted by law enforcement personnel. System 400 thus allows speedy apprehension of perpetrators of parking regulations, felony laws, misdemeanor laws, or other suitable laws based on identification of such persons in parking locations.

Figure 5:
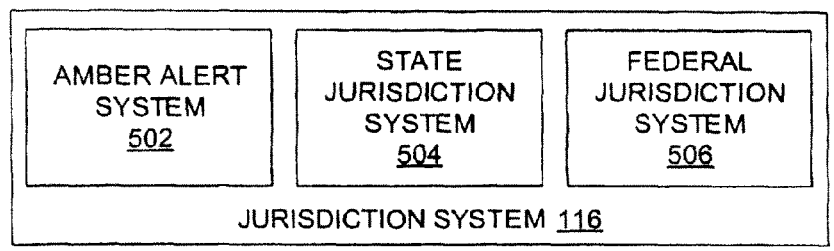
FIG. 5 is a diagram of a system for determining a jurisdiction for providing an alert to in accordance with an exemplary embodiment of the present invention.

FIG. 5 is a diagram of a system 500 for determining a jurisdiction for providing an alert to in accordance with an exemplary embodiment of the present invention. System 500 includes jurisdiction system 116 and Amber Alert system 502, state jurisdiction system 504, and federal jurisdiction system 506, each of which can be implemented in hardware, software, or a suitable combination of hardware and software, and which can be one or more software systems operating on a general purpose processing platform.

Amber Alert system 502 interfaces with one or more Amber Alert systems and generates Amber Alert notification data based upon vehicle identification data received from the amber alert systems. In one exemplary embodiment, an Amber Alert notification may be generated when a child is abducted, and can include a vehicle tag number, vehicle make, vehicle color, abductor information, or other identifying data. In this exemplary embodiment, meter system 102 or monitor system 104 provide this additional data to aid in the location of the abductor or abducted child. Likewise, video monitoring system 118 or other suitable systems can be activated by Amber Alert system 502 in the vicinity of where an abduction has occurred, such as to obtain image data of the perpetrator prior to the commission the abduction, to obtain image data to locate the perpetrator after commission of the abduction, or other suitable data.

State jurisdiction system 504 generates notification data for state law enforcement personnel for violations of state law. In one exemplary embodiment, state jurisdiction system 504 can include county jurisdiction systems, city jurisdiction systems, or other suitable systems that alert the appropriate law enforcement personnel based on the jurisdiction where the vehicle data is obtained. For example, if meter system 102 or monitor system 104 is located in a municipality, then the dispatcher for that municipality can be alerted if the infraction is one that can be handled by law enforcement personnel from the municipality. Otherwise, state jurisdiction system 504 can notify the state, county, municipality, or other authorities, so that such authorities can work in concert to apprehend the perpetrator.

Federal jurisdiction system 506 generates federal jurisdiction alert data, such as for matters of national security, homeland security, Drug Enforcement Agency matters, FBI matters, CIA matters, or other suitable data. In one exemplary embodiment, the data in federal jurisdiction system 506 can be controlled or encrypted, such as to limit access to the data to authorized personnel. In this exemplary embodiment, federal jurisdiction system 506 can be hosted in a secure location, and can receive notification data and generate suitable confirmation data to allow system 100 to confirm that the alert has been received. Likewise, other suitable processes can be performed.

In operation, system 500 allows appropriate authorities to be notified in the event that a perpetrator has been identified from a watch list. System 500 helps to reduce the number of false alarms or notifications to personnel who are unable to provide assistance in detaining a perpetrator, and also ensures that the security of the various dispatcher systems or other notification systems is maintained so as to prevent such systems from being compromised.

Figure 6:
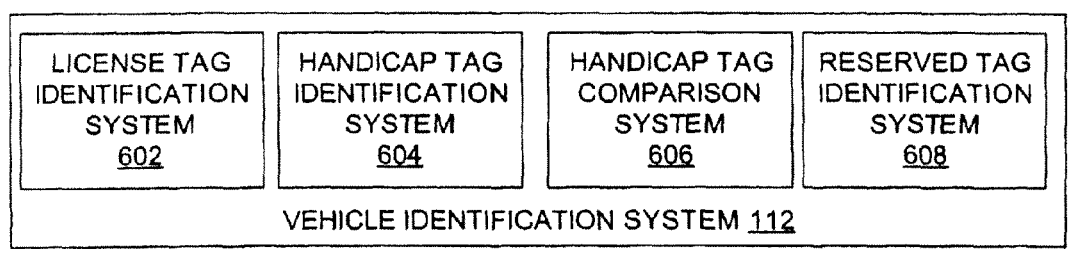
FIG. 6 is a diagram of a system for providing tag identification data in accordance with the exemplary embodiment of the present invention.

FIG. 6 is a diagram of a system 600 for providing tag identification data in accordance with the exemplary embodiment of the present invention. System 600 includes vehicle identification system 112 and license tag identification system 602, handicap tag identification system 604, handicap tag comparison system 606, and reserved tag identification system 608, each of which can be implemented in hardware, software, or a suitable combination of hardware and software, operating on a general purpose processing platform.

License tag identification system 602 receives image data and identifies license tag data from the image data. In one exemplary embodiment, license tag identification system 602 can use image analysis techniques to quickly identify license tags, such as based on characteristics of license tags, the location of the license tag data within a frame, or other suitable processes.

Handicap tag identification system 604 receives image data and determines whether a handicap tag is present. In one exemplary embodiment, a handicap tag may be hung from a rear view mirror, placed on a dashboard, or otherwise disclosed in a vehicle in a non-uniform manner. The handicap tag can have a characteristic color, symbol, or other data that can be readily identified through image analysis. Handicap tag identification system 604 readily identifies whether a handicap tag is present, such as when image data is transmitted from a parking area that is reserved for handicapped persons.

Handicap tag comparison system 606 receives license tag data and compares the license tag data to a list of approved handicap license tags or performs other suitable functions. In this exemplary embodiment, handicap tag owners can be required to register the license tag of their vehicle, such as at a website or when they obtain their license tag, such that the failure to have registered at the website can result in generation of a parking violation. Likewise, registration of the license tag can be performed by the medical personnel that assess whether an individual is handicapped or other suitable personnel. In addition, where handicap tags are not associated to a specific license plate number, handicap tag comparison system 606 can allow handicapped persons to register the current tag of the vehicle they are in, such as by using a dial-in interactive voice response system or other suitable processes.

Reserved tag identification system 608 determines whether a vehicle parking in a parking area has a tag, decal, or is otherwise designated as being authorized to park in a reserved area. In one exemplary embodiment, a list of license tags can be pre-registered that are authorized to park in the reserved parking areas. Likewise, a radio frequency ID tag, barcode decal, a tag having a pre-determined color or location on the vehicle, or other suitable features can be used to quickly identify tags for reserved areas and to verify whether parking in the area constitutes a parking infraction. Reserve tag identification system 608 can also interface with violation warning system 306, notification system 206, or other suitable systems so as to notify a person that they have parked in an inappropriate area and to allow them to move before generating an infraction.

In operation, system 600 allows license tags, special parking permits, handicap tags, or other suitable tags to be readily identified, so as to allow parking areas that have been reserved for handicapped or other personnel to be monitored to determine when unauthorized individuals have parked in those locations.

Figure 7:
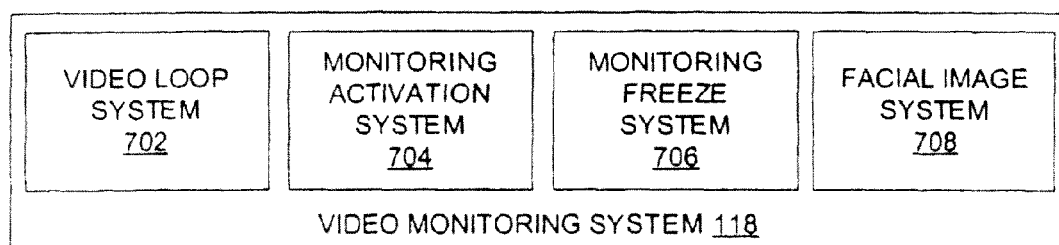
FIG. 7 is a diagram of a system for providing video monitoring in accordance with an exemplary embodiment of the present invention.

FIG. 7 is a diagram of a system 700 for providing video monitoring in accordance with an exemplary embodiment of the present invention. System 700 includes video monitoring system 118 and video loop system 702, monitoring activation system 704, monitoring freeze system 706, and facial image system 708, each of which can be implemented in hardware, software, or a suitable combination of hardware and software, and which can be one or more software systems operating on a general purpose processing platform.

Video loop system 702 generates a loop of video data for a pre-determined period of time. In one exemplary embodiment, video loop system 702 can continuously loop video data from a pre-determined area by generating real-time video, a pre-determined number of video still frames during a period of time, or other suitable video loop data. Video loop system 702 can also receive data to stop recording, to mark a period, to change the frame generation rate, or to perform other suitable functions.

Monitoring activation system 704 receives monitoring activation data and causes video loop system 702 to begin monitoring at a pre-determined time. In this exemplary embodiment, monitoring activation system 704 can cause video loop system 702 to increase the frequency of image data generation, decrease the frequency of image data generation, to re-direct video loop system 702 to observe pre-determined locations, or to perform other suitable functions.

Monitoring freeze system 706 generates data that causes video loop system 702 to stop looping data or otherwise erasing data that may be of interest to law enforcement personnel. In one exemplary embodiment, monitoring freeze system 706 can cause all video monitoring devices associated with meter systems 102 and monitor systems 104 to stop recording additional data in the area where a crime has occurred, so as to prevent the destruction of data that may be useful in solving the crime.

Facial image system 708 receives image data, extracts facial image data, and can search a database of facial image data to determine whether a match has occurred. In one exemplary embodiment, facial image system 708 can extract facial image data of a vehicle occupant, a pedestrian, or other suitable persons, and can search the facial image database to identify the facial image data. In another exemplary embodiment, the facial image data can be provided to jurisdiction system 116 for use by law enforcement officers or other suitable personnel.

In operation, system 700 allows meter systems 102, monitor systems 104 or other suitable systems that have image data generation capability to increase, decrease, stop, start, or otherwise change the rate of video data generation and capture. In this manner, system 700 allows image data to be generated and gathered for rapid identification and apprehension of perpetrators.

Figure 8:
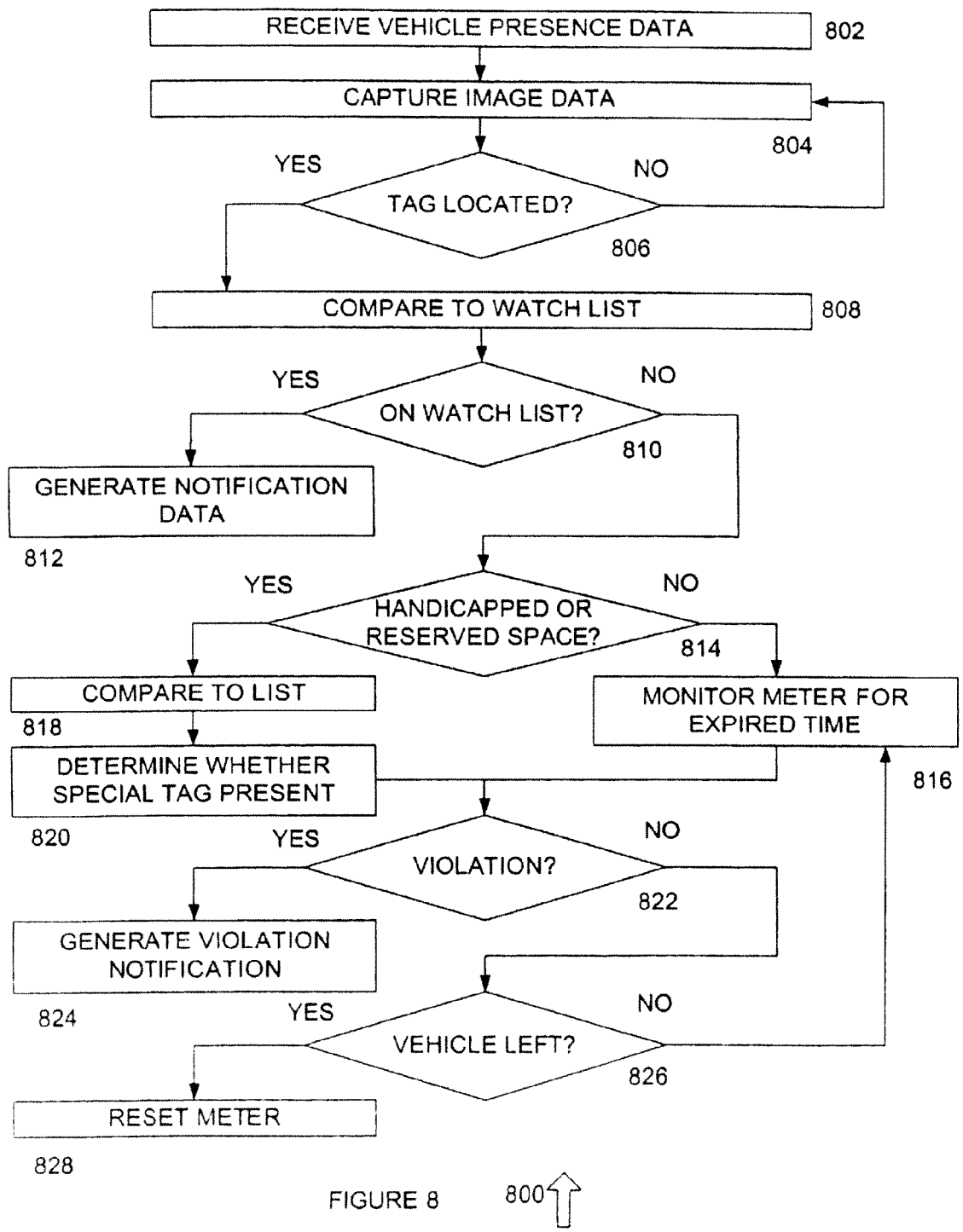
FIG. 8 is a flowchart of method for performing vehicle identification, tracking and parking enforcement in accordance with an exemplary embodiment of the present invention.

FIG. 8 is a flowchart of method 800 for performing vehicle identification, tracking and parking enforcement in accordance with an exemplary embodiment of the present invention. Method 800 allows vehicles to be tracked and identified as they park in parking areas or enter predetermined locations so as to ensure that parking violations are detected, to increase parking revenue generation, to track vehicles of interest, and to perform other suitable processes.

Method 800 begins at 802 where vehicle presence data is received. In one exemplary embodiment, vehicle presence data can be received using a weight sensor, metal sensor, laser reflection data, image data, motion sensors, or in other suitable manners. The method then proceeds to 804.

At 804, image data is captured of a pre-determined area that is known to have license tag data or other suitable vehicle identification data. Likewise, radio frequency tag data can be acquired, barcode data can be acquired, or other suitable data can be acquired. The method then proceeds to 806.

At 806, it is determined whether a vehicle ID tag has been located in the image data In one exemplary embodiment, the image data can be analyzed to detect a vehicle ID tag. If it is determined at 806 that no suitable vehicle ID tag has been located, the method returns to 804 where image data is again captured, such as after adjustments have been made to the field of view, focus, or other parameters. Likewise, if a vehicle ID tag is located at 806, it can be checked against a database of vehicle ID tag data to determine whether the vehicle ID tag is an actual vehicle ID tag and has not been misread from a bumper sticker or other sources of text data. After a vehicle ID tag is located, the method proceeds to 808.

At 808, the vehicle ID tag data is compared to a watch list of vehicle ID tags for which various parking violations or other violations may exist. In one exemplary embodiment, the watch list can be used to detect parking violations, parole violations, escaped felons, for homeland security purposes, or for other suitable purposes. The method then proceeds to 810.

At 810, it is determined whether the vehicle ID tag was located on the watch list. If it is determined that the vehicle ID tag was located on the watch list, the method proceeds to 812 where notification data is generated. In one exemplary embodiment, additional processes can be performed to generate notification data for appropriate law enforcement personnel. If it is determined at 810 that the vehicle ID tag is not on the watch list, the method proceeds to 814.

At 814, it is determined whether the parking area in which the vehicle is located is a handicap space, a reserved space, or other controlled space. If it is determined that the parking area is a controlled space, the method proceeds to 818 where the vehicle ID tag is compared to a list of vehicles that have authorization for parking in such controlled spaces. If no such list is present or if a match is not found, the method proceeds to 820 where it is determined whether a special tag is present, such as by analyzing the image data to locate a pre-determined tag identifying a handicapped parking permit, a reserved parking permit, receiving radio frequency tag data, or other suitable data. The method then proceeds to 822. Likewise, it if is determined that the parking area is not a handicap or reserved space at 814, then the method proceeds to 816 where the meter is monitored to determine whether the time is expired. The method then proceeds to 822.

At 822, it is determined whether a violation has occurred, such as whether the parking area is a handicap or a reserved space and if the tag is not on a list of authorized vehicles for such spaces, whether a suitable authorization tag has not been detected, whether the time on the meter has expired, or whether other suitable conditions exist. If it is determined at 822 that a violation has occurred, the method proceeds to 824 where violation notification data is generated, such as to notify parking enforcement personnel, law enforcement personnel, or other suitable personnel, to generate a violation record that will be transmitted to owner of record of the vehicle, or other suitable processes. Likewise, if it is determined at 822 that a violation has not occurred, the method proceeds to 826.

At 826, it is determined whether the vehicle has left the parking area. If it is determined that the vehicle has left the parking area, the method proceeds to 828 and the meter is reset. Otherwise, the method returns to 816 where the meter is monitored to determine whether the time has expired.

In operation, method 800 allows parking areas to be monitored to determine whether a parking violation has occurred, such as whether a vehicle is parked in an area beyond a time for which parking has been paid, whether the vehicle is parked in an area at a time when parking is not permitted, whether the vehicle parking in the parking area is not authorized to park because the area is for handicapped persons or is reserved, or whether other violations have occurred. Method 800 thus allows parking violations and other violations to be detected and cited and does not require parking enforcement personnel to be present to observe the violation.

Figure 9:
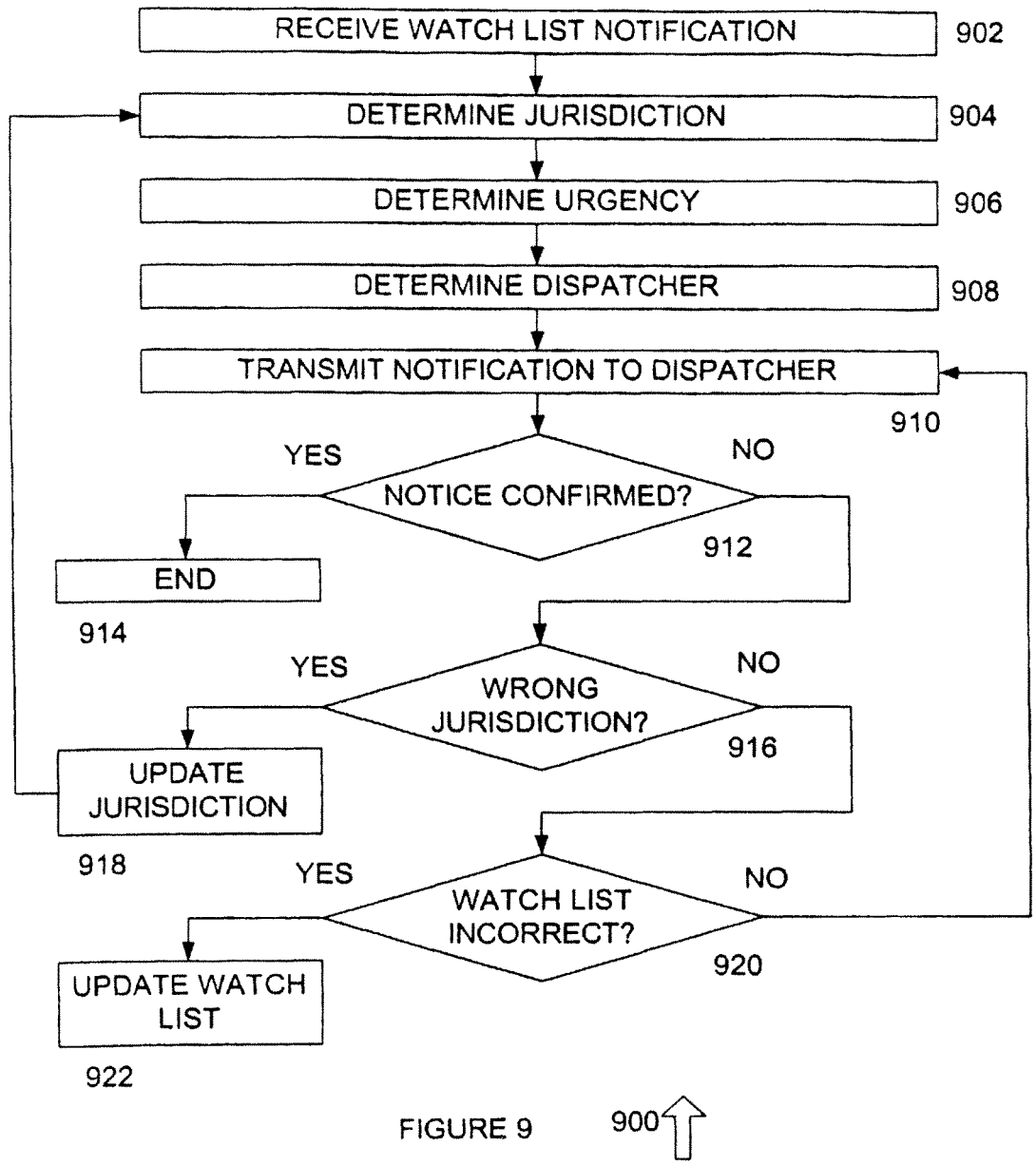
FIG. 9 is a diagram of a method for providing notification data to authorities of the presence of a perpetrator in accordance with an exemplary embodiment of the present invention.

FIG. 9 is a diagram of a method 900 for providing notification data to authorities of the presence of a perpetrator in accordance with an exemplary embodiment of the present invention. Method 900 begins at 902 where watch list notification is received. In one exemplary embodiment, the watch list notification identify a perpetrator, the perpetrator's vehicle, the crime for which the perpetrator has been arraigned, or other suitable data. The method then proceeds to 904.

At 904, the jurisdiction of the perpetrator is determined, such as based on the location of the parking meter, the crime for which the perpetrator has been arraigned, or other suitable data. For example, if it is determined that the watch list notification has been transmitted to the incorrect dispatcher, then jurisdiction correction data can be provided. The method then proceeds to 906.

At 906, the urgency of the notification is determined based on the crime for which the perpetrator has been arraigned, or other suitable data, such as the length of time the perpetrator has been at large, the severity of the crime for which the perpetrator has been arraigned, or other suitable data. The method then proceeds to 908.

At 908, a dispatcher is determined, such as a county dispatcher, a state dispatcher, a city dispatcher, a federal dispatcher, or other suitable dispatchers. The method then proceeds to 910 where notification data is transmitted to the dispatcher. For example, the notification data can be transmitted using a dedicated notification interface, using standard law enforcement protocols, or in other suitable manners. The method then proceeds to 912.

At 912, it is determined whether notice has been confirmed. In one exemplary embodiment, the dispatcher can be required to confirm that notice has been received to prevent re-transmission of the notification. If it is determined at 912, that the notice has been confirmed, the method proceeds to 914 and terminates. Otherwise, the method proceeds to 916 where it is determined whether the wrong jurisdiction has been provided with the notice. In one exemplary embodiment, the dispatcher, can determine whether the wrong jurisdiction has been identified. Likewise, if no response is received to the notice within a pre-determined period of time, then the jurisdictional analysis can be performed locally or in other suitable manners. If it is determined at 916 that the wrong jurisdiction was identified, the method proceeds to 918 where the jurisdiction is updated and the notice is transmitted to the proper jurisdiction. The method then returns to 904. Otherwise, the method proceeds to 920.

At 920, it determines whether the watch list data was incorrect. For example, if a watch list data was issued for a perpetrator who has recently been apprehended or has resolved the violation, then the method proceeds to 922 where the watch list data is updated. Otherwise, the method return to 910 and the notification is re-transmitted to the dispatcher, such as with an indication that no response had been received to the notification. Likewise, suitable upgrade procedures can be used, such as where notification is transmitted to a police officer, an investigator, or other suitable personnel.

In operation, method 900 allows law enforcement personnel to be notified when data is obtained from vehicle identification system that indicates that a perpetrator or person wanted for commission of a crime is present in a location. Method 900 allows appropriate personnel to be notified, such as where the perpetrator may be violent or armed, and also allows ranking of the severity of the response so as apply appropriate resources to the apprehension of perpetrators.

Figure 10:
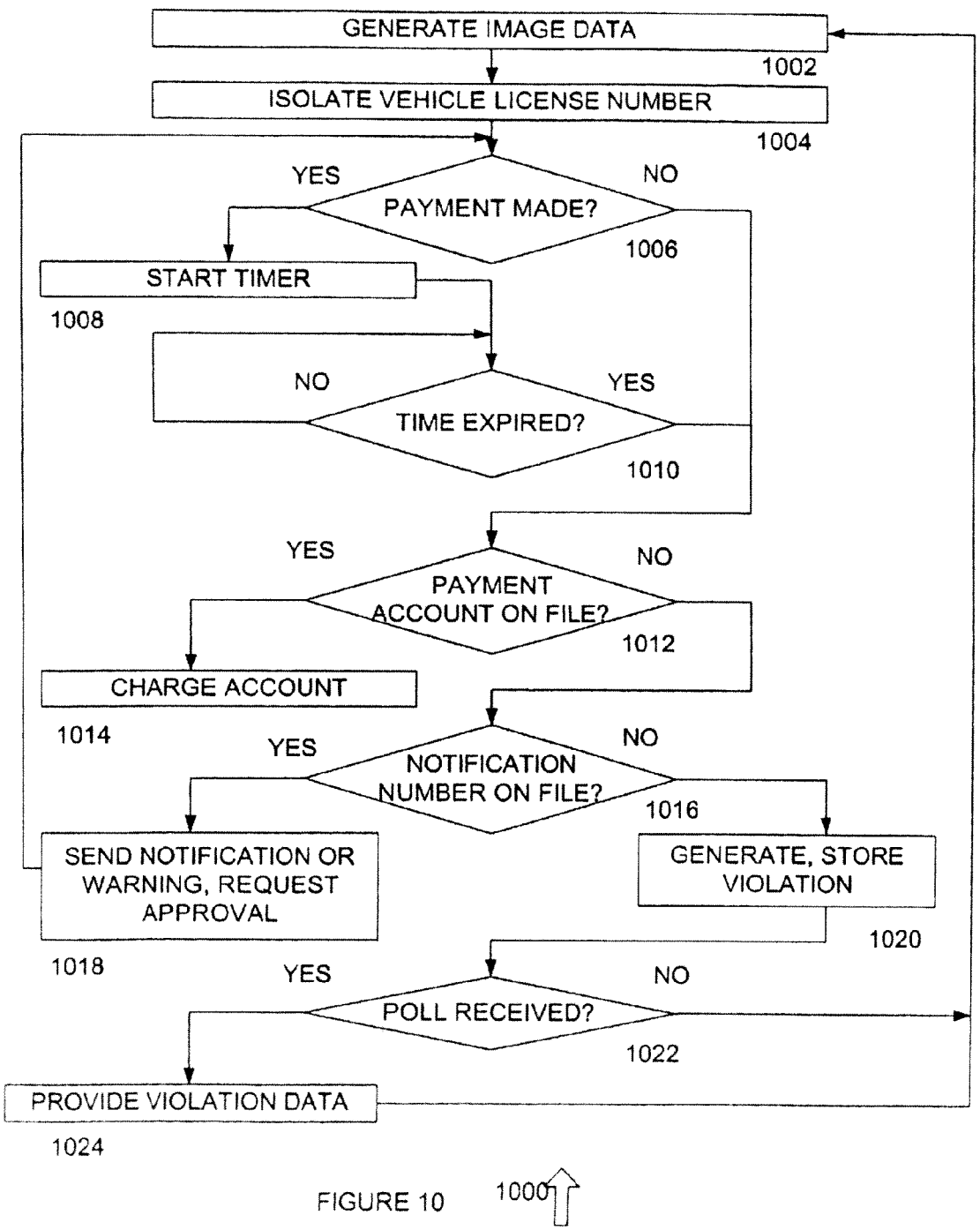
FIG. 10 is a flowchart of a method for monitoring parking areas in accordance with an exemplary embodiment of the present invention.

FIG. 10 is a flowchart of a method 1000 for metering parking areas in accordance with an exemplary embodiment of the present invention. Method 1000 begins at 1002 where image data is generated. In one exemplary embodiment, the image data can include image data for one or more parking locations, or other suitable image data. The method then proceeds to 1004.

At 1004, vehicle ID data is isolated, such as by analyzing image data to identify pre-determined lettering types, images, locations, or other suitable processes. The method then proceeds to 1006.

At 1006, it is determined whether payment has been made, such as whether coins or banknotes have been inserted into a meter, whether a credit card or other suitable payment device has been used to pay for a parking time allotment or other suitable processes have been performed. If it is determined at 1006 that payment has not been made, the method proceeds to 1012. Otherwise, the method proceeds to 1008 where a timer is initiated and the method proceeds to 1010.

At 1010, it is determined whether the timer has expired. If the timer has not expired, the method loops until timer expiration occurs. Then the method proceeds 1012.

At 1012, it is determined whether a payment account is on file. In one exemplary embodiment, a payment account can be used and associated with a vehicle license number so that parking charges for a vehicle can be paid for without providing coinage, banknotes, or otherwise prepaying at an area. If it is determined that a payment account is on file, the method proceeds to 1014 where the account is charged. Otherwise, the method proceeds to 1016.

At 1016, it is determined whether notification data is on file. In one exemplary embodiment, notification data can include a cell phone number, a pager number, an email address, short message service and instant message address, or other suitable notification data that allows the operator of the vehicle to be notified that a pending violation is about to occur. If it is determined that notification data is on file, the method proceeds to 1018 where a notification, warning, request for approval to pay for additional time, or other suitable data is transmitted to the user. For example, if the operator of the vehicle has stored payment data, such as a credit card number or ACH data, then payment for the additional time can be used. Likewise, if there is a balance on a credit account or other suitable sources of payment, the payment can be pre-authorized, authorized upon receipt of approval, or other processes can be used. Likewise, the user can be notified of the pending violations so the user can decide whether or not to remain or leave the parking area. The method then returns to 1006.

If it is determined that at 1016 that a notification number is not on file, the method proceeds to 1020 where violation is generated and stored. In one exemplary embodiment, the violation data can be generated and stored locally at the parking meter. The method then proceeds to 1022.

At 1022, it is determined whether a poll has been received. In one exemplary embodiment, a poll can be received by or from parking enforcement personnel who poll meters as they approach using an infrared device, radio frequency device, or other suitable devices. In this manner, if no parking violations have occurred, the parking enforcement personnel can remain in their vehicle and continue to travel while searching for vehicles that have violations. If poll is not received at 1022, the method returns to 1002. Otherwise, the method proceeds to 1024 where violation data is provided. In this exemplary embodiment, the violation data can allow the parking enforcement personnel to determine whether the perpetrator is still located in the parking area, thus allowing the parking enforcement personnel to verify that a violation has occurred and to issue a ticket. Likewise, the violation data can identify that the vehicle is no longer present, thus allowing the parking enforcement personnel to provide the violation data to a central database for generation of a violation notice for mailing to the address of the vehicle owner or to perform other suitable functions. Further, if the violating vehicle has departed the parking space, notification on a real-time basis to a jurisdictional parking violation ticket issuing system can take place in lieu of polling by parking enforcement personnel.

In operation, method 1000 allows a parking meter to operate in a standalone mode such as where the meter is periodically polled or periodically transmits data to a centralized server as opposed to being in real-time communication with such a server. Method 1000 thus allows parking enforcement personnel to verify parking infractions, such as where verification is required by local ordinances or other legal guidelines.

Figure 11:
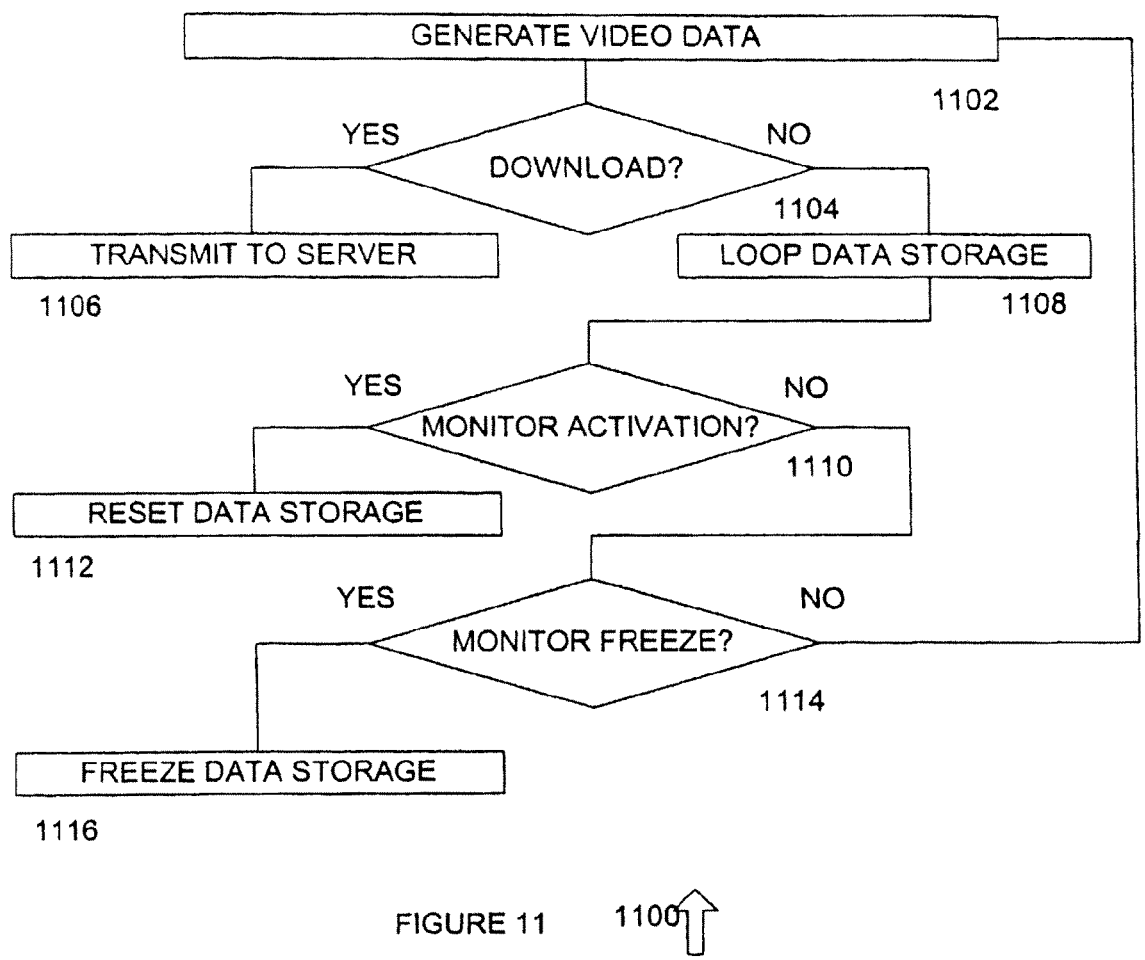
FIG. 11 is a flowchart of a method for generating video data from one or more meter systems or monitor systems in accordance with an exemplary embodiment of the present invention.

FIG. 11 is a flowchart of a method 1100 for generating video data from one or more meter systems 102 or monitor systems 104 in accordance with an exemplary embodiment of the present invention. Method 1100 begins at 1102 where video data is generated. In one exemplary embodiment, the video data can be generated in real-time, based on a predetermined number of frames per second so as to provide limited video capability, can be generated in an adjustable number of frames per second, or can be provided in other suitable processes. The method then proceeds to 1104.

At 1104, it is determined whether the video data is to be downloaded, such as by transmitting the video data to a server, a data storage device, or other suitable processes. If it is determined that 1104 that the video data is to be downloaded, the method proceeds to 1106 where the video data is transmitted to a server, a data storage device, or other suitable areas. Otherwise, the method proceeds to 1108 where the data storage is looped. In one exemplary embodiment, data storage loop can be performed over a pre-determined period of time, such as every two hours, every four hours, or in other suitable period so as to allow the amount of data storage to be coordinated with the ability of law enforcement personnel to generate notification data for tracking of perpetrators or for other suitable purposes. The method then proceeds to 1110.

AT 1110, it is determined whether monitor activation has been received. In one exemplary embodiment, the monitor activation can include activation for starting a period of monitoring so as to maximize the amount of time from an initiation point that video data can be stored, and can also include frames per second data or other suitable data for identifying the resolution of the video data, for directing the video monitor in a pre-determined direction, or in other suitable processes. If it is determined that monitor activation has been received at 1110, the method proceeds to 1112 where the data storage is reset and the monitor activation data parameters are implemented. Otherwise, the method proceeds to 1114.

At 1114, it is determined whether monitor freeze data has been received. In one exemplary embodiment, monitor freeze data can be received to keep a record of video data that has been recorded after a crime has been committed so as to retain evidence that may be useful in identifying a perpetrator or locating the location of a perpetrator. If it is determined at 1114 that monitor freeze data has been received, the method proceeds to 1116 where the data storage for the video data is frozen. Otherwise, the method returns to 1102.

In operation, method 1100 allows meter systems 102, monitor systems 104, or other suitable systems to be used to provide video data for use in law enforcement activities. Method 1100 allows such monitor systems to be reset to begin tracking data, such as when a perpetrator is believed to be entering an area, can be used to stop, overwriting or looping of monitor data, such as where it is believed that a perpetrator has passed through an area or committed a crime in an area, or other suitable processes can be performed.

Although exemplary embodiments of a system and method of the present invention have been described in detail herein, those skilled in the art will also recognize that various substitutions and modifications can be made to the systems and methods without departing from the scope and spirit of the appended claims.

What is claimed is:

1. A surveillance system for monitoring a plurality of vehicle license plates comprising:

a portable license plate reader including a camera for automatically imaging a license plate and extracting a character string from the image for each of a plurality of moving vehicles that pass through a field of view of the camera without detection by the moving vehicles;

a mobile surveillance unit positioned in proximity to the license plate reader for receiving the extracted character string from the reader, comparing each extracted character string with a list of target plate numbers, and generating an audible alarm and a visual display when a match is found;

an operations center for communicating with the mobile surveillance unit to receive each extracted character string from the mobile surveillance unit and to update the list of target plate numbers stored at the mobile surveillance unit; and an alert system for transmitting an alert to one or more external enforcement systems.

2. The surveillance system for monitoring vehicle license plates of claim 1 wherein the portable license plate reader comprises:

a camera for imaging of vehicle license plates; and an image acquisition and processing device coupled to the camera to acquire images of the vehicle license plates from the camera and to extract character strings of each detected license plate.

3. The surveillance system for monitoring vehicle license plates of claim 2 wherein the portable license plate reader further comprises a device to control infrared emissions.

4. The surveillance system for monitoring vehicle license plates of claim 2 wherein the portable license plate reader further comprises a wireless communications device for transmitting extracted license plate character strings to the mobile surveillance unit.

5. The surveillance system for monitoring vehicle license plates of claim 1 wherein the mobile surveillance unit comprises:

a wireless communications device for receiving extracted license plate character strings from each license plate reader;

a display device for displaying each received license plate character string;

a storage device for storing the list of target plate numbers and the captured license plate character strings from each license plate reader; and a processing unit for comparing each received license plate character string with the list of target plate numbers and displaying each license plate character string that matches an entry from the target list.

6. The surveillance system for monitoring vehicle license plates of claim 1 wherein the portable license plate reader is mounted on a structure positioned adjacent to a roadway.

7. The surveillance system for monitoring vehicle license plates of claim 1 wherein the portable license plate reader comprises:

a camera for imaging of vehicle license plates; and an image acquisition and processing device coupled to the camera to acquire images of the vehicle license plates from the camera and to extract character strings of each detected license plate;

wherein the portable license plate reader further comprises a device to generate infrared emissions; and wherein the portable license plate reader further comprises a wireless communications device for transmitting extracted license plate character strings to the mobile surveillance unit.

8. The surveillance system for monitoring vehicle license plates of claim 1 wherein the mobile surveillance unit comprises:
- a wireless communications device for receiving extracted license plate character strings from each license plate reader;
- a display device for displaying each received license plate character string;
- a storage device for storing the list of target plate numbers and the captured license plate character strings from each license plate reader;
- a processing unit for comparing each received license plate character string with the list of target plate numbers and displaying each license plate character string that matches an entry from the target list; and
- wherein the portable license plate reader is mounted on a structure positioned adjacent to a roadway.

9. The surveillance system for monitoring vehicle license plates of claim 1 wherein the mobile surveillance unit comprises:
- a wireless communications device for receiving extracted license plate character strings from each license plate reader; and
- a display device for displaying each received license plate character string.

10. The surveillance system for monitoring vehicle license plates of claim 1 wherein the mobile surveillance unit comprises:
- a wireless communications device for receiving extracted license plate character strings from each license plate reader; and
- a storage device for storing the list of target plate numbers and the captured license plate character strings from each license plate reader.

11. The surveillance system for monitoring vehicle license plates of claim 1 wherein the mobile surveillance unit comprises:
- a wireless communications device for receiving extracted license plate character strings from each license plate reader; and
- a processing unit for comparing each received license plate character string with the list of target plate numbers and displaying each license plate character string that matches an entry from the target list.

12. A surveillance system for monitoring a plurality of vehicle license plates comprising:
- a portable license plate reader including a camera for automatically imaging a license plate and extracting a character string from the image for each of a plurality of moving vehicles that pass through a field of view of the camera without detection by the moving vehicles;
- a mobile surveillance unit positioned in proximity to the license plate reader for receiving the extracted character string from the reader, comparing each extracted character string with a list of target plate numbers, and generating an audible alarm and a visual display when a match is found;
- an operations center for communicating with the mobile surveillance unit to receive each extracted character string from the mobile surveillance unit and to update the list of target plate numbers stored at the mobile surveillance unit; and
- a violation system for generating a violation notice for one or more of the moving vehicles.

13. The surveillance system for monitoring vehicle license plates of claim 12 wherein the portable license plate reader comprises:
- a camera for imaging of vehicle license plates; and
- an image acquisition and processing device coupled to the camera to acquire images of the vehicle license plates from the camera and to extract character strings of each detected license plate.

14. The surveillance system for monitoring vehicle license plates of claim 13 wherein the portable license plate reader further comprises a device to control infrared emissions.

15. The surveillance system for monitoring vehicle license plates of claim 13 wherein the portable license plate reader further comprises a wireless communications device for transmitting extracted license plate character strings to the mobile surveillance unit.

16. The surveillance system for monitoring vehicle license plates of claim 12 wherein the mobile surveillance unit comprises:
- a wireless communications device for receiving extracted license plate character strings from each license plate reader;
- a display device for displaying each received license plate character string;
- a storage device for storing the list of target plate numbers and the captured license plate character strings from each license plate reader; and
- a processing unit for comparing each received license plate character string with the list of target plate numbers and displaying each license plate character string that matches an entry from the target list.

17. The surveillance system for monitoring vehicle license plates of claim 12 wherein the portable license plate reader is mounted on a structure positioned adjacent to a roadway.

18. The surveillance system for monitoring vehicle license plates of claim 12 wherein the portable license plate reader comprises:
- a camera for imaging of vehicle license plates; and
- an image acquisition and processing device coupled to the camera to acquire images of the vehicle license plates from the camera and to extract character strings of each detected license plate;
- wherein the portable license plate reader further comprises a device to generate infrared emissions; and
- wherein the portable license plate reader further comprises a wireless communications device for transmitting extracted license plate character strings to the mobile surveillance unit.

19. The surveillance system for monitoring vehicle license plates of claim 12 wherein the mobile surveillance unit comprises:
- a wireless communications device for receiving extracted license plate character strings from each license plate reader;
- a display device for displaying each received license plate character string;
- a storage device for storing the list of target plate numbers and the captured license plate character strings from each license plate reader;
- a processing unit for comparing each received license plate character string with the list of target plate numbers and displaying each license plate character string that matches an entry from the target list; and
- wherein the portable license plate reader is mounted on a structure positioned adjacent to a roadway.

20. The surveillance system for monitoring vehicle license plates of claim 12 wherein the mobile surveillance unit comprises:

a wireless communications device for receiving extracted license plate character strings from each license plate reader; and a display device for displaying each received license plate character string.

\* \* \* \* \*